3,495,692
SAFETY ACCELERATOR BRAKE CONTROL
Fremont Holgate, 3064 Norwalk Drive,
Dallas, Tex. 75220
Filed Oct. 25, 1967, Ser. No. 677,930
Int. Cl. F16d 23/00, 27/00, 67/00
U.S. Cl. 192—3  8 Claims

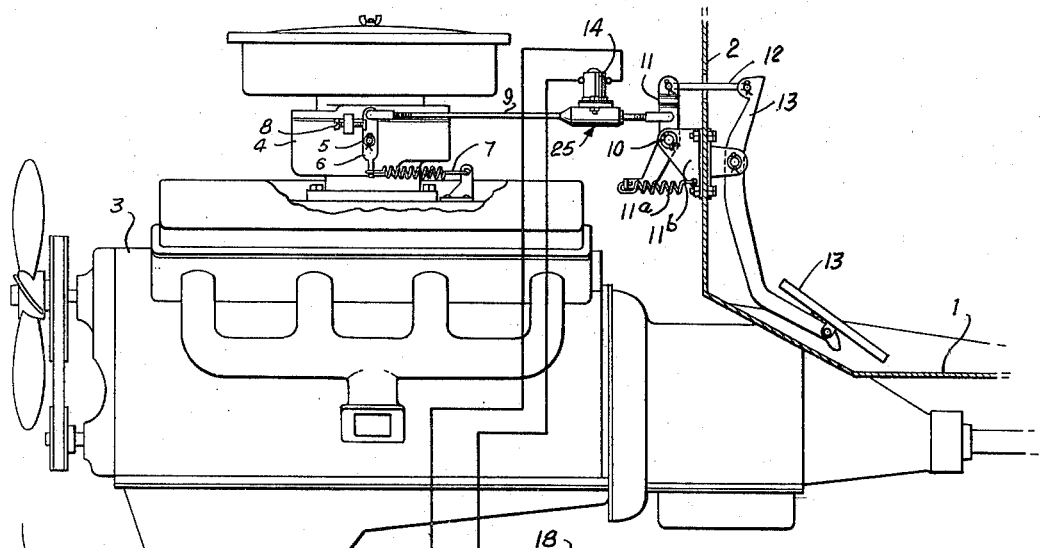
Fig. I
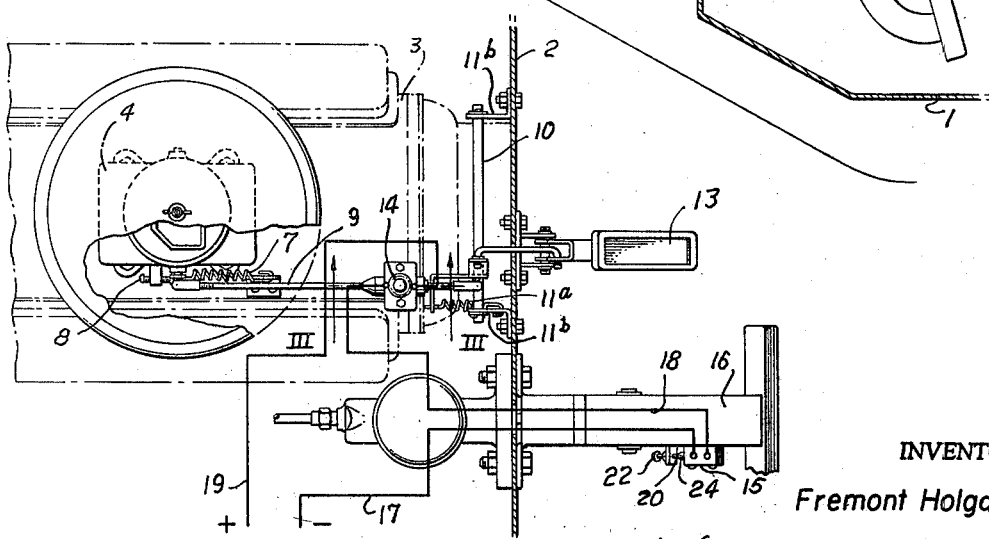
Fig. II
INVENTOR
Fremont Holgate
BY Howard E. Moore
ATTORNEY

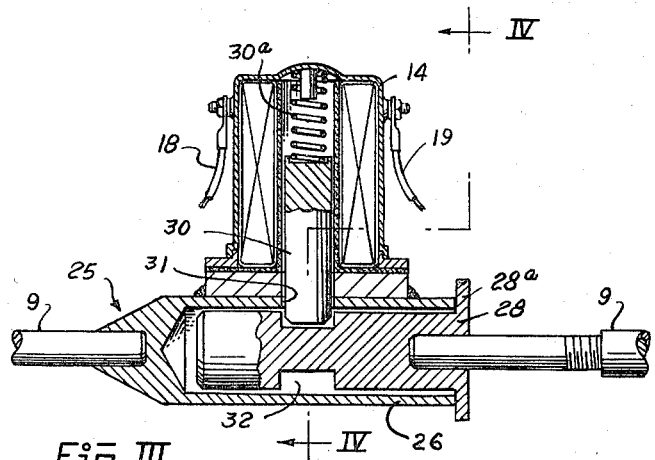
Fig. III
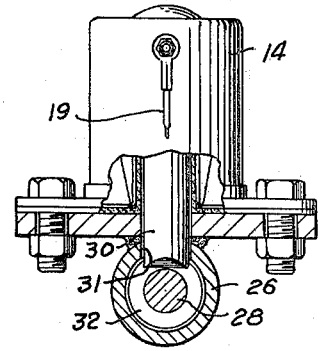
Fig. IV
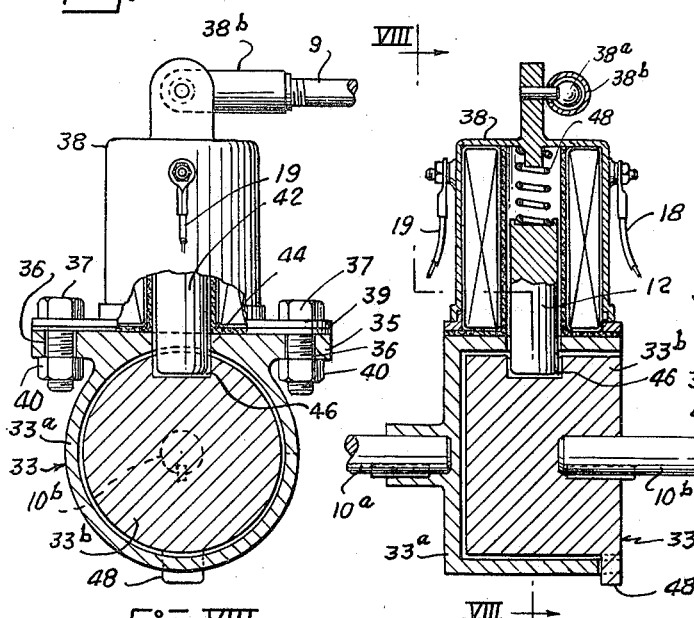
Fig. VIII    Fig. VII
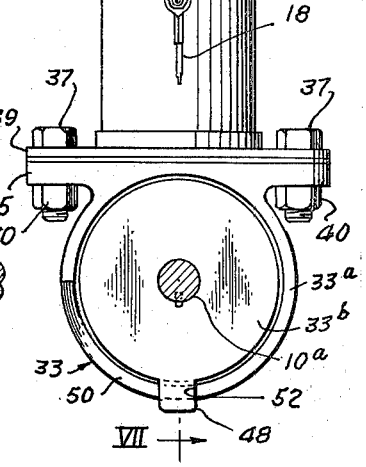
Fig. VI
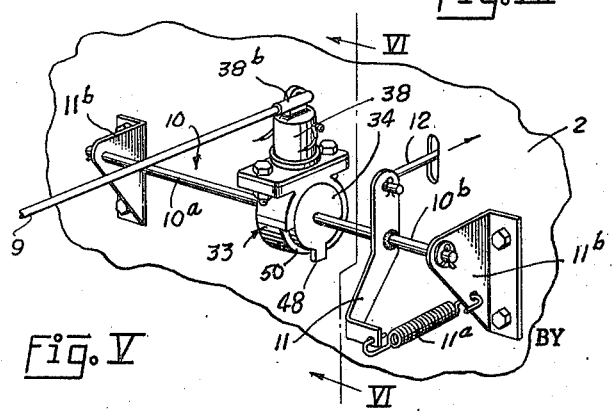
Fig. V
INVENTOR
Fremont Holgate
BY Howard E. Moore
ATTORNEY Feb. 17, 1970  F. HOLGATE  3,495,692
SAFETY ACCELERATOR BRAKE CONTROL
Filed Oct. 25, 1967  3 Sheets-Sheet 3
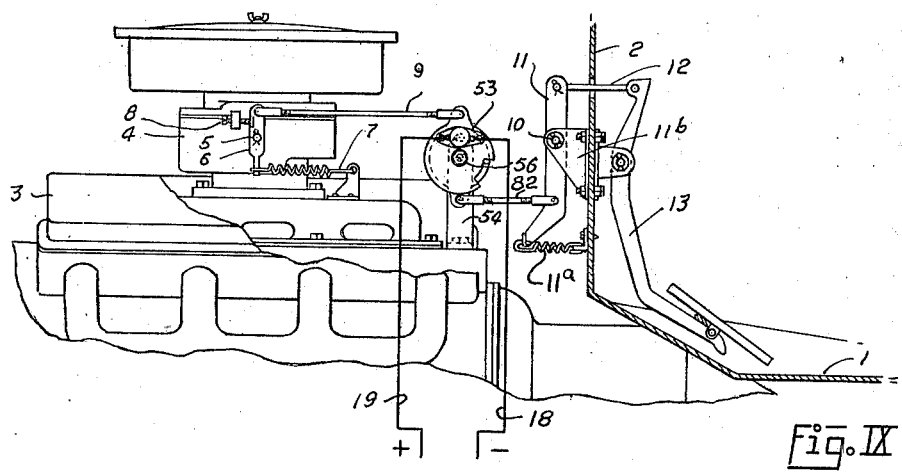
Fig. IX
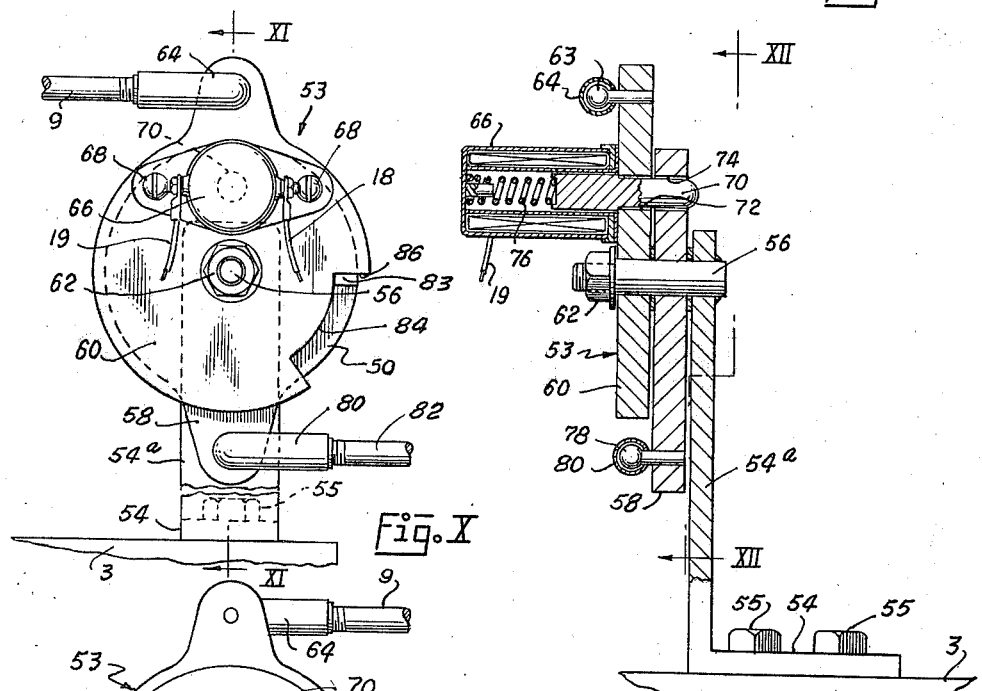
Fig. X
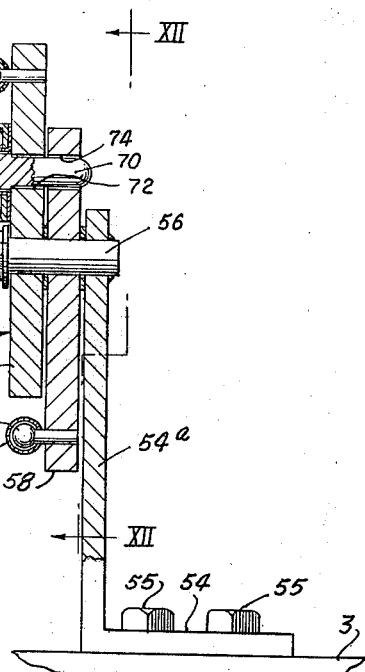
Fig. XI
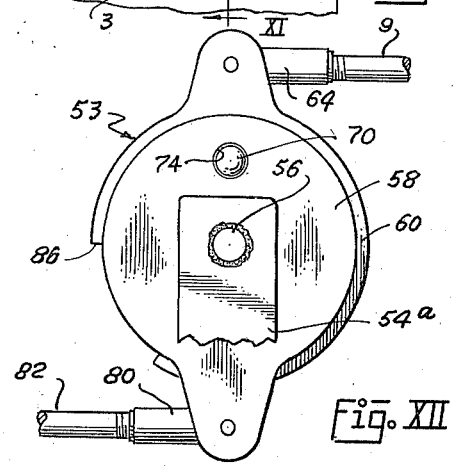
Fig. XII
INVENTOR
Fremont Holgate
BY Howard E. Moore
ATTORNEY

United States Patent Office 3,495,692
Patented Feb. 17, 1970

ABSTRACT OF THE DISCLOSURE

An electrically operated safety deivce for automatically disengaging the accelerator linkage of an engine when the brake is applied, and for automatically engaging the accelerator linkage when the brake is released to restore normal operation.

BACKGROUND OF THE INVENTION

This invention is an improvement in devices which heretofore have utilized complicated hydraulic devices or mechanical linkages to prevent the simultaneous acceleration and braking of an engine. The present invention is a novel device which is more positive in its operation, dependable, durable and simpler and more economical in construction and operation than the prior complex devices.

SUMMARY OF THE INVENTION

Specifically, this invention relates to an improvement in safety devices for motor vehicles, and more particularly to electrical means for disengaging the accelerator linkage to the carburetor and thus preventing the flow of fuel to the engine while the brake is being applied.

A primary object of the present invention is to provide a safety device in which the accelerator linkage is disengaged when the brake is applied so that the motor vehicle may be stopped even though the accelerator pedal may be mistakenly depressed or accidentally stuck in depressed condition.

A further object of the invention is to provide a device which will contribute to maximum braking efficiency by reducing the flow of fuel to the engine when the brakes are applied.

A further object of the invention is to provide a device which will minimize wear on brake linings by causing minimum power output from the engine to be delivered when the brake is applied.

BRIEF DESCRIPTION OF THE DRAWING

Three embodiments of the invention are shown by the attached drawings wherein,

FIGURE I is a side elevation view showing the relationship of one form of the present invention to the conventional components of a motor vehicle.

FIGURE II is a plan view of the device shown in FIGURE I.

FIGURE III is an enlarged cross-sectional view taken substantially on line III—III of FIGURE II.

FIGURE IV is a cross-sectional view taken substantially on line IV—IV of FIGURE III.

FIGURES V, VI, VII, and VIII shown a second embodiment of the invention.

FIGURE V is a perspective view of the second embodiment of the invention.

FIGURE VI is a cross-sectional view taken substantially along line VI—VI of FIGURE V showing an elevation view of the second embodiment.

FIGURE VII is a cross-sectional view taken along line VII—VII of FIGURE VI.

FIGURE VIII is a cross-sectional view taken substantially along line VIII—VIII of FIGURE VII.

FIGURES IX, X, XI and XII show a third embodiment of the invention.

FIGURE IX is an elevation view showing the relationship of the third embodiment of the invention to the conventional components of a motor vehicle.

FIGURE X is an enlarged elevation view of the invention as shown in FIGURE IX.

FIGURE XI is a cross-sectional view taken substantially along line XI—XI of FIGURE X.

FIGURE XII is an elevation view of the third embodiment looking in the direction indicated by the arrows in FIGURE XI with parts broken away.

DESCRIPTION OF THE PREFERRED EMBODIMENT

Numeral references are employed to indicate the various parts shown in the drawing and like numerals indicate like parts throughout the various figures of the drawing.

Referring to the drawings and particularly the embodiment shown in FIGURES I, II, III and IV, the numeral 1 designates the floor of a motor vehicle which connects with the firewall 2. The numerals 3 and 4 designate a conventional engine and carburetor respectively. Fuel flows to the engine 3 when shaft 5, which controls the butterfly valve of the carburetor, is rotated by crank 6. Crank 6 is held in the idle position by a spring 7 which pivots the crank 6 to contact the adjustment screw 8. Crank 6 is rotated by the accelerator rod 9 which is moved longitudinally when bell crank 11 pivots about shaft 10 which is journaled in bearings 11b attached to an immovable part of the vehicle. Bell crank 11 is pivoted by longitudinal movement of rod 12 when accelerator pedal 13 is pressed toward the floor 1.

An electrically operated solenoid device 14 is actuated by the closing of switch 15, when the brake pedal 16 is pressed thereby completing a circuit consisting of an electrical power source (not shown), wire 17, switch 15, wire 18, solenoid 14 and wire 19.

An arm 20 is fixedly attached to the conventional brake pedal 16 in such a manner as to move as a part of the brake pedal. An adjustment screw 22 is mounted in the arm 20. Switch 15 is mounted to an immovable portion of the vehicle in such a position that the adjustment screw 22 holds the switch 15 in an open position by pressure applied to spring-urged movable contact 24, so that electrical current cannot flow through wires 17 and 18 when the brake pedal is in the non-depressed position. When the brake pedal 16 is depressed it is moved downward, releasing the pressure applied by adjustment screw 22 and movable contact 24 moves outward to close switch 15, thereby completing the circuit and allowing current to flow through wires 17 and 18.

Wires 18 and 19 are connected to solenoid 14 which is mounted on accelerator rod 9. Accelerator rod 9 is segmented by a telescoping coupling designated generally by numeral 25 consisting of tubular member 26 and a telescoping member 28. Lock pin 30 is the core of solenoid 14 and passes through aperture 31 in tubular member 26 and engages a lock groove 32 in telescoping member 28 thereby preventing axial movement of members 26 and 28 relative one to the other. Locking pin 30 is retracted through aperture 31 and disengages locking groove 32 when the solenoid 14 is actuated allowing members 26 and 28 to move axially relative one to the other. When pin 30 is retracted from locking groove 32, spring 7 pulls crank 6 and accelerator rod 9 to the position it occupies when the engine is idling. When the force is removed from the accelerator pedal 13, the spring 11a rotates bell crank 11 which pushes telescoping member 28 into tubular member 26. Telescoping member 28 has an enlarged flanged portion 28a at one end which contacts the end of the tubular member 26 when the accelerator 13 is released to assure proper alignment between the locking pin 30 and locking groove 32. Spring 30a pushes lock pin 30 through aperture 31 into locking groove 32 when solenoid 14 is not energized.

DESCRIPTION OF THE SECOND EMBODIMENT

Referring to the particular embodiment shown in FIGURES V, VI, VII and VIII the numeral 9 designates a conventional accelerator rod, one end of which is attached to the crank 6 which operates the butterfly valve in the carburetor and the other end of which is fastened to the second embodiment of the solenoid 38 fixedly mounted on accelerator cross shaft 10 by a mating ball 38a and socket 38b, attached to the respective members. Accelerator cross shaft 10 consists of shaft members 10a and 10b connected with a coupling 33 composed of outer barrel 33a and inner barrel 33b, As shown in FIGURE VIII, outer barrel 33a has a mounting plate 35 tangentially formed at one side thereof with holes 36 which receive bolts 37 to fixedly secure solenoid device 38 which has a mounting plate 39 to mounting plate 35 by bolts 37 and nuts 40. Inner barrel 33b is disengageably attached by a lock pin 42 to outer barrel 33a. Lock pin 42 is the core of solenoid 38 and extends through aperture 44 in the outer barrel 33a and is received by lock hole 46 in the inner barrel 33b. Lock pin 42 is held in lock hole 46 by spring 48 until the switch 15 is closed when the brake pedal 16 is depressed, at which time the solenoid device 38 is energized and lock pin 42 is retracted out of lock hole 46 into aperture 44, allowing rotation of the outer barrel 33a relative to inner barrel 33b. When the outer barrel 33a is disengaged from the inner barrel 33b spring 7 pulls crank 6 and accelerator rod 9 to the position which they occupy when the engine 3 is idling. When the brake pedal 16 is released, switch 15 is opened and spring 48 in solenoid device 38 pushes the pin 42 through aperture 44. When the accelerator pedal 13 is released spring 11a rotates accelerator cross shaft 10 to the idle position and lock pin 42 engages lock hole 46, locking inner barrel 33b to outer barrel 33a. To assure proper alignment of lock pin 42 and lock hole 46 alignment means comprising a lug 48 is formed on the inner barrel 33b, which travels in groove 50 in such a manner that lug 48 will contact shoulder 52 when the lock pin 42 and lock hole 46 are in proper alignment.

DESCRIPTION OF THE THIRD EMBODIMENT

Referring to the particular embodiment shown in FIGURES IX, X, XI and XII, the butterfly valve of the carburetor 4 is opened and closed by shaft 5 and crank 6. When the crank 6 is in the idle position it is held in contact with the adjustment screw 8 by spring 7. Accelerator rod 9 is attached to the upper end of crank 6 at one end, and the other end of accelerator rod 9 is attached to the third embodiment of the disengageable attachment of the accelerator linkage designated generally by the numeral 53. The third embodiment of the disengageable attachment consists of an angular mounting bracket 54 which is secured to the engine 3 by threaded bolts 55. Shaft 56 is perpendicularly welded or otherwise securely attached to the upturned face 54a of the angular bracket 54. Plates 58 and 60 are held on shaft 56 by a nut 62 which screws on to a threaded portion of shaft 56. Accelerator rod 9 is connected to plate 60 by a mating ball 63 and socket 64 which are attached to the respective members. Solenoid device 66 is secured to plate 60 by screws 68 in such a manner as to move as a component part of plate 60. Plate 60 is disengageably attached by a lock pin 70 to plate 58. Lock pin 70 extends through aperture 72 in plate 60 and is received by lock hole 74 in plate 58. Lock pin 70 is held in lock hole 74 by spring 76 until switch 15 is closed energizing the solenoid device 66 which retracts lock pin 70, allowing plates 58 and 60 to rotate on shaft 56 independently. When lock pin 70 is retracted, spring 7 pulls the crank 6, accelerator rod 9 and plate 60 to the idle position. Plate 58 is connected by ball 78 and socket 80 to link 82 which connects plate 58 and bell crank 11. Bell crank 11 is rotatably mounted on accelerator cross shaft 10. Spring 11a holds the bell crank 11 in the idle position until the bell crank 11 is rotated by application of a downward force on the accelerator 13 which moves rod 12 longitudinally, rotating bell crank 11. To assure realignment of lock pin 70 with lock hole 74 when force is removed from accelerator pedal 13, a aligning means comprising lug 83 is formed on the face of plate 58 which seats into a cut-away groove surface in plate 60 in such a manner that the lug 83 contacts shoulder 86 in camming surface 84 when the lock pin 70 and the lock hole 74 are axially aligned.

As may be seen from the foregoing description of each of the three embodiments of the present invention, the linkage consisting of accelerator rod 9, crank 6 and shaft 5 are automatically disengaged from the linkage connected to the accelerator pedal 13 when the brake pedal 16 is pressed, allowing the engine 3 to idle. Though each of the above described embodiments accomplishes the same purpose one may be more easily mounted into existing engine controls than another, depending upon the design of the existing engine controls.

It will be understood that other and further devices and structure for carrying out my invention may be devised without departing from the spirit and scope of the appended claims.

Having described my invention, I claim:

1. The combination with the brake mechanism of an automobile and an engine having a carburetor, including, an accelerator pedal connected by a mechanical linkage to said carburetor; co-axially aligned shafts rotatably disposed in said linkage; a disengageable coupling co-axially aligned with and rigidly connected between the co-axially aligned rods in said mechanical linkage for disconnecting same to render the accelerator pedal ineffective; electrically actuated means carried by the linkage disengageably connecting said coupling; and switch means actuated by depressing the brake pedal for actuating said electrically actuated means when the brakes are applied.

2. The combination called for in claim 1 wherein said coupling includes relatively movable elements, and the electrically actuated means includes a solenoid actuated locking pin extendable through aligned apertures in the relatively movable elements, and being retractable upon actuation of the switch means.

3. The combination called for in claim 2 with the addition of spring means for returning the pin to extended position and re-engaging said coupling when the brake is released.

4. The combination called for in claim 2 with means for aligning said locking pin with the apertures for locking the said movable elements together when the brake is released.

5. The combination called for in claim 2 wherein said movable elements include a tubular member; a telescoping member rotatably disposed in the tubular member; a locking aperture in said telescoping member; and an aperture in said tubular member through which the pin extends into the locking aperture.

6. The combination called for in claim 5 with the addition of aligning means between the tubular member and thee telescoping member for aligning said aperture and the locking aperture when the brake is released.

7. The combination called for in claim 2 wherein said relatively movable elements include an outer barrel mounted on one part of the linkage; an inner barrel arranged to be telescopically received in the outer barrel, said inner barrel being mounted on another portion of the linkage; an aperture in the outer barrel; and a lock hole in the inner barrel through which the locking pin movably extends, said movable elements being arranged to rotate together when the locking pin extends through the lock hole in the inner barrel and being incapable or rotating together when the locking pin disengages the lock hole in the inner barrel.

8. The combination called for in claim 7 with the addition of aligning means between the inner and outer barrels for aligning the aperture and lock hole.

References Cited
UNITED STATES PATENTS

| | | | |
|---|---|---|---|
| 1,889,656 | 11/1932 | Hass | 192—3 XR |
| 2,164,921 | 7/1939 | Hoff | 192—3 |
| 2,763,349 | 9/1956 | Pokorny | 192—3 XR |
| 2,765,058 | 10/1956 | Struthers | 192—3 XR |
| 3,164,220 | 1/1965 | Wurgler | 192—3 |
| 3,331,478 | 7/1967 | Trifiletti et al. | 192—3 |
| 3,366,204 | 1/1968 | Couffer | 192—3 |

MARTIN P. SCHWADRON, Primary Examiner

LESLIE J. PAYNE, Assistant Examiner